United States Patent
Katagiri et al.

(10) Patent No.: US 6,872,484 B2
(45) Date of Patent: *Mar. 29, 2005

(54) HUMIDIFYING SYSTEM FOR A FUEL CELL

(75) Inventors: Toshikatsu Katagiri, Saitama (JP);
Hiroshi Shimanuki, Saitama (JP);
Motohiro Suzuki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 280 days.

This patent is subject to a terminal disclaimer.

(21) Appl. No.: 10/193,038

(22) Filed: Jul. 11, 2002

(65) Prior Publication Data

US 2003/0012993 A1 Jan. 16, 2003

(30) Foreign Application Priority Data

Jul. 13, 2001 (JP) ........................................ 2001-213806

(51) Int. Cl.[7] .............................................. H01M 8/04
(52) U.S. Cl. .............................. 429/26; 429/22; 429/34
(58) Field of Search .............................. 429/22, 23, 24, 429/25, 26, 34

(56) References Cited

U.S. PATENT DOCUMENTS

| | | | | |
|---|---|---|---|---|
| 6,416,895 B1 | * | 7/2002 | Voss et al. | 429/26 X |
| 6,656,620 B2 | * | 12/2003 | Katagiri et al. | 429/26 |
| 6,713,204 B2 | * | 3/2004 | Shimanuki et al. | 429/26 |
| 2002/0098395 A1 | * | 7/2002 | Shimanuki et al. | 429/26 X |
| 2002/0164509 A1 | * | 11/2002 | Wheat et al. | 429/22 |
| 2003/0108781 A1 | * | 6/2003 | Oh et al. | 429/34 X |

FOREIGN PATENT DOCUMENTS

JP    2002-117879    * 4/2002    ............ H01M/8/04

* cited by examiner

*Primary Examiner*—Stephen J. Kalafut
(74) *Attorney, Agent, or Firm*—Anthony A. Laurentano; Lahive & Cockfield, LLP

(57) ABSTRACT

A fuel cell includes an anode and a cathode, and a fuel gas supplied to the anode and an oxidant gas supplied to the cathode chemically react with each other to generate electricity. Moisture contained in a cathode exhaust gas discharged from the cathode is transferred to the fuel gas in a first humidifier and then to the oxidant gas in a second humidifier. The cathode exhaust gas flows through a cathode exhaust gas passage from the cathode via the first humidifier to the second humidifier. A bypass is provided to the cathode exhaust gas passage to allow part of the cathode exhaust gas to detour round the first humidifier and flow to the second humidifier. Accordingly, the balance between humidification levels of fuel gas and oxidant gas each supplied to the fuel cell may be kept and adjusted properly even when the output of the fuel cell gets higher.

10 Claims, 10 Drawing Sheets

HUMIDIFYING SYSTEM FOR A FUEL CELL

BACKGROUND OF THE INVENTION

This invention relates to humidifying systems for fuel cells, and more particularly to a humidifying system that utilizes a hollow fiber membrane to humidify fuel gases and oxidant gases each supplied to the fuel cell.

Polymer electrolyte fuel cells have been attracting widespread attention in recent years as being a power source for electric vehicles, and the like. The polymer electrolyte fuel cell (PEFC) can generate power at ordinary temperatures, and is thus finding various practical applications.

In general, a fuel cell system includes a fuel cell divided by a solid polymer electrolyte membrane into a cathode and an anode in such a manner that the solid polymer electrolyte membrane is sandwiched between the cathode and anode provided at each side of the membrane. The cathode is supplied with air containing oxygen and the anode is supplied with fuel gases containing hydrogen. A chemical reaction then takes place between oxygen in the supplied air and hydrogen in the supplied fuel gases, thereby generating electric power, which is used to drive an external load.

Efficiency in power generation of the fuel cell system depends upon several important parameters, which include ionic conductivity of hydrogen ions migrating across the solid polymer electrolyte membrane. The higher ionic conductivity, the more hydrogen ions may migrate across the solid polymer electrolyte membrane for each unit hour, thus increasing electric power generated through the electrochemical reaction.

Keeping the ionic conductivity high however requires the solid polymer electrolyte membrane to remain humidified so as not to dry up; therefore, every fuel cell system includes a humidifier without exception.

Among usable humidifiers are an ultrasonic humidifier, a nozzle-jetting humidifier, a steam humidifier, and the like, but most commonly used is a humidifier employing a hollow fiber membrane because of its lower power consumption and compact body that serves to save space for installation.

An exemplified humidifying system for a fuel cell including such a humidifier as conventionally designed is illustrated in FIG. 11.

Referring to FIG. 11, a fuel-cell humidifying system 100 principally includes a fuel cell 101, two humidifiers 102, 103, an ejector 104, and a supercharger (S/C) 105. The fuel cell 101 includes an anode 101a and an cathode 101c, and allows hydrogen in fuel gases supplied to the anode 101a and oxygen or oxidant gases in the air supplied to the cathode 101c to react with each other, thereby generating electric power. The humidifiers 102, 103 humidify gases supplied to the anode 101a and the cathode 101c in the fuel cell 101 by transferring moisture containing in cathode exhaust gases discharged from the cathode 101c of the fuel cell 101. The ejector 104 serves to circulate and supply fuel gases to the anode 110a. The S/C (supercharger) 105 supplies air as oxidant gases to the cathode 101c. Hereupon, it is to be understood that the fuel cell 101 is included as a component in the humidifying system.

A description will be given of operation of the fuel-cell humidifying system 100 as described above.

In operation, fuel gases having no or low moisture, which have been regulated at a specific pressure in a regulator 106 and supplied to the ejector 104, are supplied to the humidifier 102 after passing through the ejector 104. The fuel gases (low-moisture gases) supplied to the humidifier 102 are humidified, while passing through a humidification module in the humidifier 102, by the cathode exhaust gases (moisture-rich gases) discharged from the cathode 101c of the fuel cell 101. Thereafter, the humidified fuel gases are supplied to the anode 101a. Hydrogen in the fuel gases fed to the anode 101a in the fuel cell 101 reacts with oxygen in the air supplied from the S/C (supercharger) 105 to the fuel cell 101, and generates electric power. Fuel gases unused in the reaction in the fuel cell 101 are supplied as anode exhaust gases to a subsequent process (e.g., for use in a catalytic combustor). Part of the anode exhaust gases is sucked by the ejector 104, and is recirculated as fuel gases.

On the other hand, air (as low-moisture gas) in the atmosphere is sucked and pressurized in the S/C (supercharger) 105, and supplied to the humidifier 103.

The air (low-moisture gas) supplied to the humidifier 103 is humidified, while passing through the humidification module, by the cathode exhaust gases (moisture-rich gases) discharged from the humidifier 102, and is then supplied to the cathode 101c. Air unused for reaction with hydrogen in the fuel gases in the fuel cell 101 is first supplied to the humidifier 102 as cathode exhaust gases (moisture-rich gases). The cathode exhaust gases supplied to the humidifier 102, while passing through the humidification module in the humidifier 102, provide moisture to humidify the fuel gases supplied from the ejector 104 to the humidifier 102, and are discharged from the humidifier 102. The cathode exhaust gases discharged from the humidifier 102 are then supplied to the humidifier 103, and provide moisture to humidify air supplied from the S/C (supercharger) 105 to the humidifier 103, while passing through the humidification module in the humidifier 103. The cathode exhaust gases discharged from the humidifier 103 are supplied to a subsequent process (e.g., for use in catalytic combustor).

However, the conventional fuel-cell humidifying system 100 as described above has disadvantages as follows:

(1) Fuel gases to be supplied to the fuel cell 101 need keeping relative humidity thereof constant. However, as chemical reaction in the fuel cell intrinsically generates heat, increase in output of the fuel cell 101 raises heat of reaction in proportion to the output, which inevitably results in increase in temperature of exhaust gases discharged from the fuel cell 101. Therefore, in the humidifier 102 that humidifies fuel gases to be supplied to the fuel cell 101, high-temperature cathode exhaust gases containing excessive moisture, i.e., supersaturated (having high vapor pressure) would be provided to humidify the fuel gases, and would thus make the fuel gases excessively humidified (raising a dew point thereof) beyond a target dew-point range required in the fuel cell 101, as shown in FIG. 12. Consequently, the continuous operation of humidifying the fuel gases with the cathode exhaust gases could disadvantageously cause a flooding phenomenon in which a passage of gases is clogged with water collected in a gap formed along the solid polymer electrolyte membrane.

(2) On the other hand, in the humidifier 103 that humidifies air to be supplied to the fuel cell 101, humidifying operation in the humidifier 102 previously performed by supplying the cathode exhaust gases, which would have excessively humidified the fuel gases, would cause a shortage of moisture, and would thus lower a dew point of the air below the target dew-point range for the fuel cell 101, as shown in FIG. 12. Consequently, the solid polymer electrolyte membrane of the fuel cell 101 would disadvantageously dry up, and would thus hinder stable generation of electric power.

The inventors made an attempt to avoid excessive humidification of the fuel gases by varying the length and number of the hollow fiber membranes provided in the humidifier 102; however, such operation could only make a straight line indicating the relationship between dew points and outputs of the fuel cell 101 translate vertically, but disadvantageously could not lay the straight line down to a horizontal position. To make matters worse, when the output of the fuel cell 101 gets higher, another disadvantageous situation would develop contrariwise in which sufficient humidification could not be achieved.

The present invention has been created to eliminate the above-discussed disadvantages.

SUMMARY OF THE INVENTION

Therefore, it is an exemplified general object of the present invention to provide a humidifying system that may have the balance between humidification levels of fuel gases and oxidant gases each supplied to a fuel cell kept and adjusted properly even when the output of the fuel cell gets higher.

According to one aspect of the present invention, a humidifying system for a fuel cell includes a fuel cell, a first humidifier, a second humidifier, a cathode exhaust gas passage, and a bypass. The fuel cell includes an anode and a cathode; a fuel gas supplied to the anode and an oxidant gas supplied to the cathode chemically react with each other to generate electricity. The first humidifier transfers moisture contained in a cathode exhaust gas discharged from the cathode, to the fuel gas through a hollow fiber membrane, while the second humidifier transfers moisture contained in a cathode exhaust gas discharged from the first humidifier, to the oxidant gas through a hollow fiber membrane. The cathode exhaust gas passage is a passage through which the cathode exhaust gas flows from the cathode of the fuel cell via the first humidifier to the second humidifier. The bypass is provided to the cathode exhaust gas passage to allow part of the cathode exhaust gas to detour round the first humidifier and flow to the second humidifier.

In this aspect of the present invention, the bypass provided to the cathode exhaust gas passage so as to avoid the first humidifier may serve to regulate a flow rate of the cathode exhaust gas according to a ratio of pressure loss in the gas passing from an upstream bifurcation of the bypass through the first humidifier to a downstream junction of the bypass relative to pressure loss in the gas passing through the bypass. The cathode exhaust gas to be flown through the first humidifier may be decreased, even when an output of the fuel cell increases and thus the flow rate of the cathode exhaust gas that flows through the first humidifier increases. Consequently, the humidification level of the fuel gas in the first humidifier may be adequately reduced.

The humidifying system may further includes a bypass flow controller that is provided in the bypass to control a flow rate of the cathode exhaust gas flowing through the bypass by varying throttle opening according to an output of the fuel cell.

The above bypass flow controller serves to control a flow rate of the cathode exhaust gas passing through the bypass irrespective of varying outputs of the fuel cell by changing throttle opening according to the output of the fuel cell. Therefore, the humidification level of the fuel gas in the first humidifier may be adequately reduced.

The above humidifying system may further include a mist distributor that is provided at a bifurcation, upstream of the first humidifier, where the cathode exhaust gas passage branches off into the bypass, to distribute a mist contained in the cathode exhaust gas to the bypass. In this arrangement, one end of the bypass is connected with the mist distributor, which is provided upstream of the first humidifier, and the other end of the bypass is connected at a position downstream of the first humidifier with the cathode exhaust gas passage. With this arrangement, part of the cathode exhaust gas containing a high mist content is not distributed to the first humidifier but directed to the second humidifier, and a high-humidity cathode exhaust gas may thus be supplied to the second humidifier located downstream of the first humidifier.

The above bypass may be arranged so as to level and/or descend throughout a length thereof with respect to a direction from an upstream end to a downstream end. Since this bypass is arranged so as not to ascend, even when the output of the fuel cell is lower and the flow velocity is lower, the bypass may be prevented from getting clogged with water into which mists have been condensed, which water would otherwise form a puddle in the bypass.

The above mist distributor may include a partition wall having varieties of forms exchangeable according to an output of the fuel cell. Alternatively, the bypass, of which a diameter is smaller than the cathode exhaust gas passage, may be connected with the cathode exhaust gas passage so that a center of the cathode exhaust gas passage and a center of the bypass are aligned with one and the same line. Alternatively, the bypass may be at least one hollow pipe provided in place of some of humidification modules in the first humidifier so that a cathode exhaust gas partially passes through the hollow pipe without transferring moisture contained therein to the fuel gas. Alternatively, the above mist distributor may include a plurality of angle plates each having an angular section with an open side thereof facing in an upstream direction. Alternatively, the above mist distributor may include an orifice that coercively raises a flow velocity of mists contained in the cathode exhaust gas, and a plurality of collision plates disposed at a downstream side of the orifice to regulate the amount of mists introduced into the first humidifier. Alternatively, the mist distributor may be a mist eliminator in which a filter medium is filled.

The above bypass may preferably be provided with a heater that heats the bypass.

Other objects and further features of the present invention will become readily apparent from the following description of preferred embodiments with reference to accompanying drawings.

DETAILED DESCRIPTION OF THE PREFERRED EMBODIMENTS

A description will now be given in detail of preferred embodiments of the present invention with reference to the drawings.

First of all, a humidifying system for a fuel cell according to a first embodiment of the present invention will be described.

Figure 1:
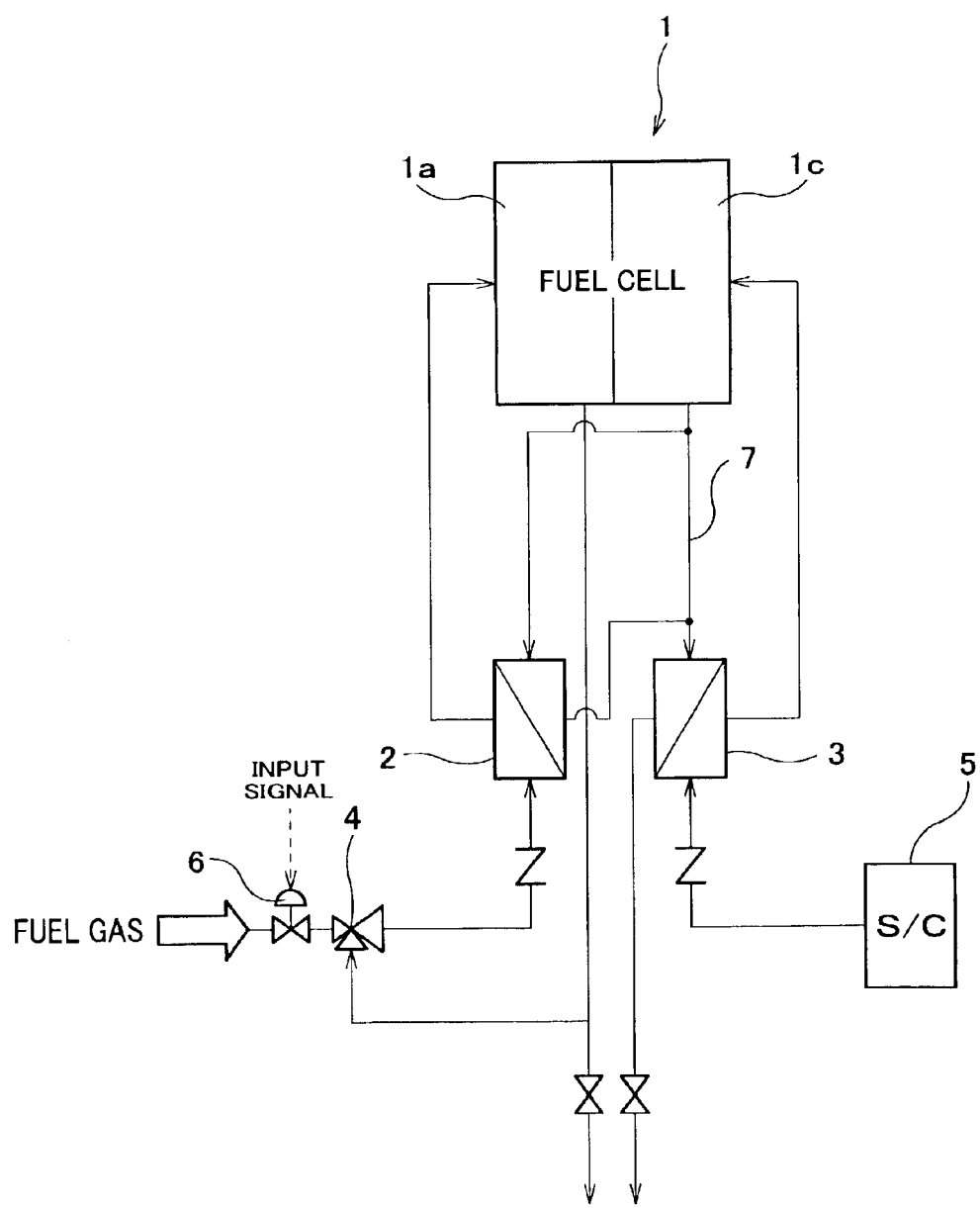
FIG. 1 is a general block diagram of a humidifying system for a fuel cell according to a first embodiment of the present invention.

FIG. 1 is a general block diagram of the humidifying system for a fuel cell according to the present invention.

The humidifying system for a fuel cell according to the first embodiment principally includes a fuel cell 1, a first humidifier, a second humidifier, a bypass 7, an ejector 4, and a supercharger (S/C) 5. The fuel cell 1 includes an anode 1a and a cathode 1c, and allows hydrogen in fuel gases supplied to the anode 1a and oxygen or oxidant gases in the air supplied to the cathode 1c to react with each other, thereby generating electricity. The first and second humidifiers humidify gases to be supplied to the anode 1a and the cathode 1c in the fuel cell 1 respectively by transferring moisture containing in cathode exhaust gases discharged from the cathode 1c of the fuel cell 1. The bypass 7 serves to conduct the cathode exhaust gases around the first humidifier. The ejector 4 serves as a reduced pressure generating means to circulate and supply fuel gases to the anode 1a. The S/C (supercharger) 5 supplies air (as oxidant gases) to the cathode 1c. Hereupon, it is to be understood that the fuel cell 1 is included as a component in the humidifying system.

The fuel cell 1, which is a polymer electrolyte fuel cell, generates electricity by reaction of hydrogen in fuel gases and oxygen in the air. The reaction is as shown in the following equations. Expressed in equation (1) is a reaction at the anode 1a; expressed in equation (2) is a reaction at the cathode 1c; and a reaction expressed in equation (3) occurs as an entire process in the fuel cell 1. Accordingly, as the fuel cell reaction proceeds, the fuel cell 1 produces water at the cathode 1c. The thus-produced water is vaporized into the air supplied to the cathode 1c, and discharged from the fuel cell 1 together with unreacted air.

$$H_2 \rightarrow 2H^+ + 2e^- \quad (1)$$

$$2H^+ + (1/2)O_2 + 2e^- \rightarrow H_2O \quad (2)$$

$$H_2 + (1/2)O_2 \rightarrow H_2O \quad (3)$$

The polymer electrolyte fuel cell 1 utilizes a solid polymer electrolyte membrane (e.g., Nafion(R) membrane, made of a perfluorosulfonic acid/PTFE copolymer in the acid form) as an electrolyte layer. The polymer electrolyte fuel cell 1 has a multilayered structure (stack) comprised of a plurality of unit cells each with the above solid polymer electrolyte membrane sandwiched between a pair of gas diffusion electrodes, which are further sandwiched from outside between a pair of separators for separating the fuel gasses and the air.

The first and second humidifiers are a fuel gas humidifier 2 and an air humidifier 3 respectively. The humidifiers 2, 3 each utilize a water-permeable hollow fiber membrane. The principle of humidification relies on a difference of partial pressures of vapors in the gases between those passing along opposite sides of the hollow fiber membrane. As the hollow fiber membrane is used a porous membrane through which gas molecules as well as water vapors may permeate.

These humidifiers 2, 3 have a plurality of the hollow fiber membranes in a bundle accommodated for example in a tubular housing, and allows fluids with different moisture contents to flow inside and outside the hollow fiber membrane separately, thereby exchanging moisture between the fluids.

The bypass 7 is a pipe provided to a cathode exhaust gas passage through which a cathode exhaust gas is discharged from the cathode of the fuel cell 1. The bypass 7 is so arranged as to allow part of the cathode exhaust gas to detour around the fuel gas humidifier 2.

With such a bypass 7 for avoiding the fuel gas humidifier 2 being provided to the cathode exhaust gas passage, the cathode exhaust gas that would otherwise entirely flow through the fuel gas humidifier 2 may be distributed partially to the bypass 7 so that a flow rate of the cathode exhaust gas may be regulated according to a ratio of pressure loss in the gas passing from an upstream bifurcation of the bypass 7 through the fuel gas humidifier 2 to a downstream junction of the bypass 7 relative to pressure loss in the gas passing through the bypass 7. Therefore, even when an output of the fuel cell 1 increases and thus the flow rate of the cathode exhaust gas that flows through the fuel gas humidifier 2 increases, the cathode exhaust gas to be flowed through the fuel gas humidifier 2 may be decreased properly. Consequently, the humidification level of the fuel gas in the fuel gas humidifier 2 may be adequately reduced.

Figure 2A:
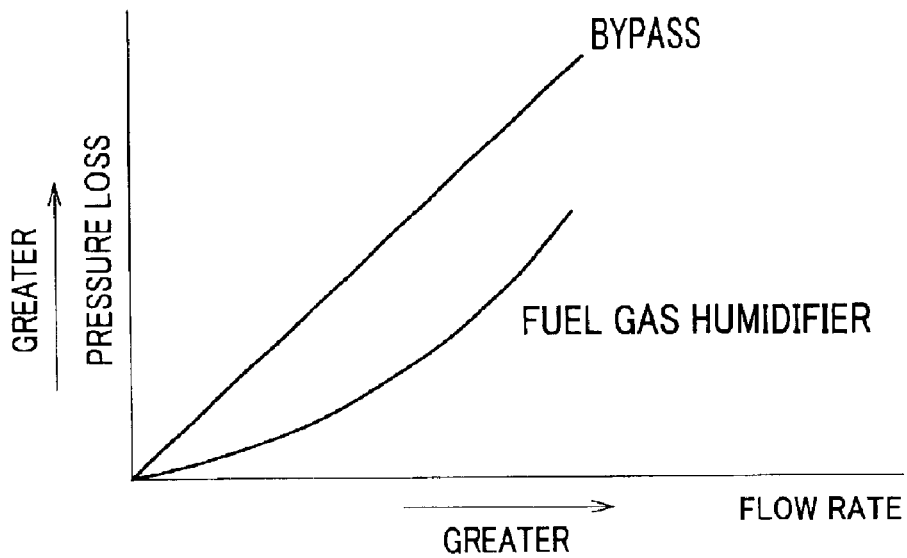
FIG. 2A is a graph showing characteristic curves of pressure losses of a bypass and a fuel gas humidifier versus flow rate of a cathode exhaust gas.

The characteristic curves of pressure losses in the bypass 7 and the fuel gas humidifier 2 versus the flow rate of the cathode exhaust gas are depicted in FIG. 2A.

As shown in the graph of FIG. 2A, the pressure loss in the fuel gas humidifier 2 is the square of the flow rate. On the other hand, the pressure loss in the bypass 7 is directly proportional to the flow rate. Accordingly, it is characteristically shown that the pressure loss in the fuel gas humidifier 2 rapidly increases when the flow rate goes beyond a specific level, while the pressure loss in the bypass 7 proportionally and thus not rapidly increases.

Figure 2B:
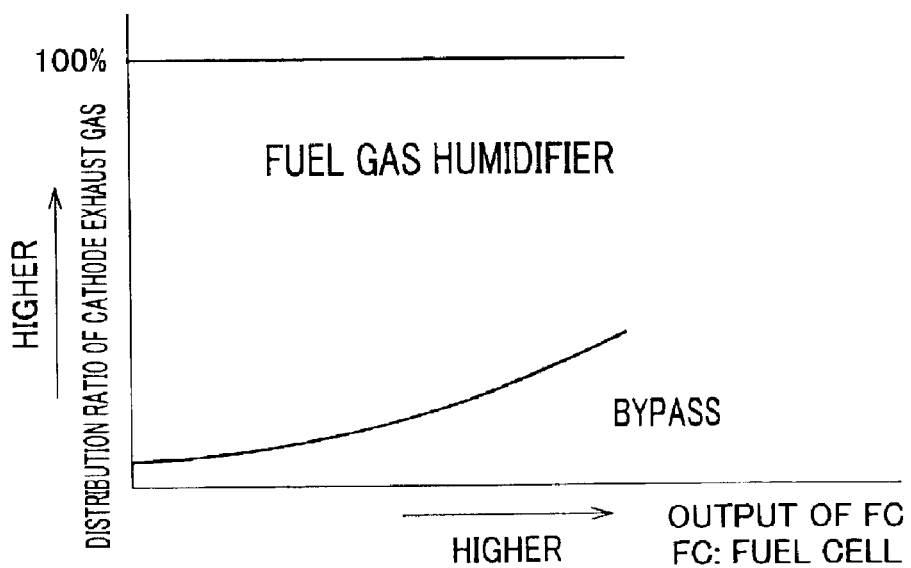
FIG. 2B is a graph showing distribution ratio of a cathode exhaust gas that can be allowed to flow to a bypass and a fuel gas humidifier respectively versus output of the fuel cell where the bypass is provided in a humidifying system.

A distribution ratio of the cathode exhaust gas that can be allowed to flow through the bypass 7 and a fuel gas humidifier 2 respectively versus the output of the fuel cell 1 where the above bypass 7 is provided in the humidifying system is depicted in FIG. 2B.

As shown in the graph of FIG. 2B, as the output of the fuel cell 1 increases, the flow rate of the cathode exhaust gas increases accordingly. However, if a flow rate of the gas passing through the fuel gas humidifier 2 exceeds a specific level, the pressure loss increases rapidly, and the gas resultantly becomes unable to flow at the flow rate exceeding the specific level. As a result, a ratio of the flow rate at which the gas is allowed to flow through the bypass 7 to that at which the gas is allowed to flow through the fuel gas humidifier 2, i.e., the distribution ratio of the cathode exhaust gas flowing through the bypass 7 increases (the amount of the cathode exhaust gas flowing through the bypass 7 increases) according as the output of the fuel cell 1 increases.

The ejector 4 as a reduced pressure generating means is a kind of vacuum pumps for recirculating fuel gases supplied to the anode 1a, and principal components thereof include a nozzle, a diffuser, a suction chamber, and the like.

Flowing fuel gases through a main stream of the ejector 4 generates a negative pressure, which sucks part of anode exhaust gases discharged from the anode 1a of the fuel cell 1, so that the sucked gases may be recirculated as the fuel gases.

The ejector 4, unlike a vacuum pump, has no rotatable, slidable, or otherwise movable part, and thus may serve to save electric power. Moreover, the ejector 4 has a simple structure that facilitates maintenance and periodical checkup. Hereupon, the main stream of the ejector 4 denotes a flow directed from upstream to downstream within the ejector 4 (for generating the negative pressure).

The S/C (supercharger) 5 is a mechanical apparatus for introducing air at a pressure in excess of that which can be obtained by natural aspiration. The S/C 5 aspirates air at an ordinary atmospheric pressure, pressurizes and supplies the air to the cathode 1c of the fuel cell 1.

A Lysholm-type or Roots-type positive-displacement compressor may be employed in place of the S/C (supercharger) 5.

A description will be given of operation of the humidifying system for a fuel cell according to the first embodiment as described above.

In operation, fuel gases having no or low moisture, which have been regulated at a specific pressure in a regulator 6 in accordance with the operating condition of the fuel cell 1, are supplied to the fuel cell humidifier 2 (first humidifier) after passing through the ejector 4. The fuel gases (low-moisture gases) supplied to the fuel gas humidifier 2 are humidified, while passing through a humidification module in the fuel gas humidifier 2, by the cathode exhaust gases (moisture-rich gases) discharged from the cathode 1c of the fuel cell 1. Thereafter, the humidified fuel gases are supplied to the anode 1a.

Hydrogen in the fuel gases fed to the anode 1a of the fuel cell 1 reacts with oxygen in the air supplied from the S/C (supercharger) 5 to the fuel cell 1, and generates electric power.

Fuel gases unused in the reaction in the fuel cell 1 are supplied as anode exhaust gases to a subsequent process (e.g., for use in a catalytic combustor). Part of the anode exhaust gases is sucked by the ejector 4, and recirculated as fuel gases.

On the other hand, air as low-moisture gas in the atmosphere is sucked and pressurized in the S/C (supercharger) 5, and supplied to the air humidifier 3.

The air (low-moisture gas) supplied to the air humidifier 3 is humidified, while passing through the humidification module, by the cathode exhaust gases (moisture-rich gases) discharged from the fuel gas humidifier 2, and is then supplied to the cathode 1c. Air unused for reaction with hydrogen in the fuel gases in the fuel cell 1 is supplied to the fuel gas humidifier 2 as cathode exhaust gases (moisture-rich gases). At this stage, even when an output of the fuel cell 1 increases and thus the flow rate of the cathode exhaust gas that flows through the fuel gas humidifier 2 increases, thanks to the bypass 7 provided to the cathode exhaust gas passage for avoiding the fuel gas humidifier 2 (first humidifier), a flow rate of the cathode exhaust gas may be regulated according to a ratio of pressure loss in the gas passing from an upstream bifurcation of the bypass 7 through the fuel gas humidifier 2 to a downstream junction of the bypass 7 relative to pressure loss in the gas passing through the bypass 7 so that the flow of the cathode exhaust gas may be distributed properly. Therefore, the humidification level of the fuel gas in the fuel gas humidifier 2 would never become excessive.

The cathode exhaust gases that have not been distributed to the bypass 7 but supplied to the fuel gas humidifier 2 while passing through the humidification module, provide moisture to humidify the fuel gases supplied from the ejector 4 to the fuel gas humidifier 2, and are discharged from the fuel gas humidifier 2. The cathode exhaust gases discharged from the fuel gas humidifier 2 merge with the cathode exhaust gases flown through the bypass 7, and are further supplied to the air humidifier 3, in which the cathode exhaust gases provide moisture to humidify air supplied from the S/C (supercharger) 5 to the air humidifier 3, while passing through the humidification module. The cathode exhaust gases discharged from the air humidifier 3 are supplied to a subsequent process (e.g., for use in catalytic combustor).

With such a bypass 7 for avoiding the fuel gas humidifier 2 (first humidifier) being provided to the cathode exhaust gas passage, the cathode exhaust gas that would otherwise entirely flow through the fuel gas humidifier 2 may be distributed partially to the bypass 7 so that a flow rate of the cathode exhaust gas may be regulated according to a ratio of pressure loss in the gas passing from an upstream bifurcation of the bypass 7 through the fuel gas humidifier 2 to a downstream junction of the bypass 7 relative to pressure loss in the gas passing through the bypass 7. Therefore, even when an output of the fuel cell 1 increases and thus the flow rate of the cathode exhaust gas that flows through the fuel gas humidifier 2 increases, the cathode exhaust gas to be flown through the fuel gas humidifier 2 may be decreased properly. Consequently, the humidification level of the fuel gas in the fuel gas humidifier 2 may be adequately reduced when the output of the fuel cell 1 is higher. Accordingly, the dew points of the fuel gases supplied to the fuel cell 1 may be equalized irrespective of varying outputs of the fuel cell 1. Further, the cathode exhaust gases directly supplied through the bypass 7 to the air humidifier 3 and thus having a high mist content may make the dew point of air supplied to the fuel cell 1 higher.

Next, a description will be given of a humidifying system for a fuel cell according to a second embodiment of the present invention with reference to the drawings.

Figure 3:
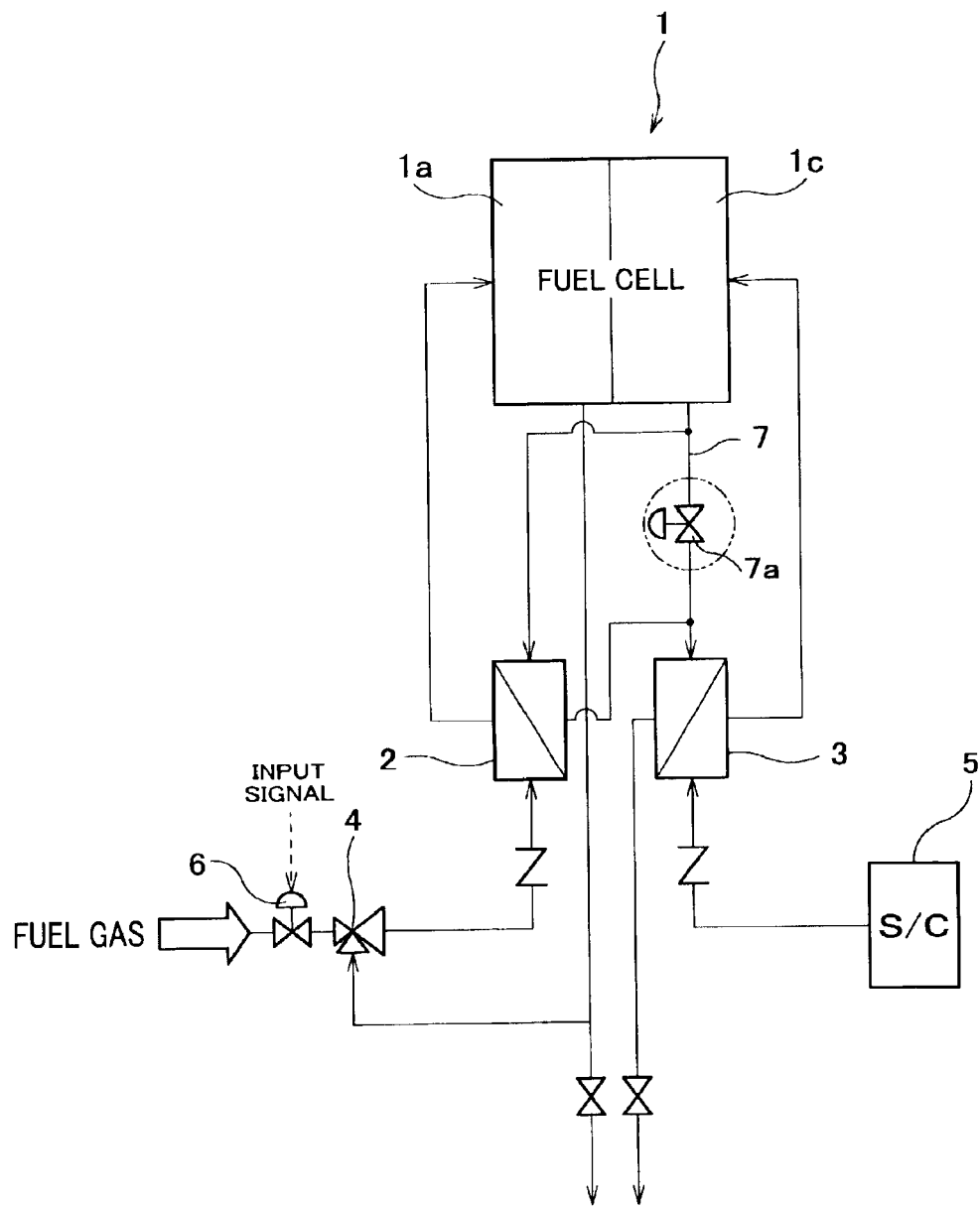
FIG. 3 is a general block diagram of a humidifying system for a fuel cell according to a second embodiment of the present invention.

A general block diagram of the humidifying system for a fuel cell according to the second embodiment is depicted in FIG. 3.

Since the distinction between the second embodiment and the first embodiment lies only in provision of a flow control valve 7a as a bypass flow controller in the humidifying system for a fuel cell according to the second embodiment, as shown in FIG. 3, a description will now be given of the flow control valve 7a only.

The same elements as in the first embodiment will be designated by the same reference numerals in describing the humidifier for a fuel cell according to the second embodiment.

The usable flow control valve 7a provided as a flow controller in the bypass 7 should be a valve having excellent flow controllability, which includes a needle valve, a gate valve, and the like.

Figure 4:
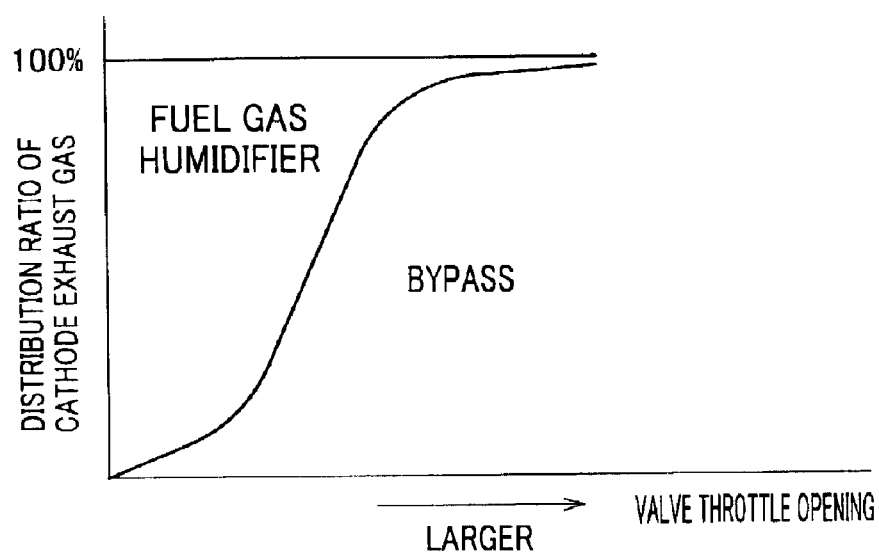
FIG. 4 is a graph showing a distribution ratio of a cathode exhaust gas that can be allowed to flow to a bypass versus throttle opening of a flow control valve provided in the bypass for illustrating a flow characteristic of the flow control valve.

A flow characteristic of the flow control valve 7a provided in the bypass 7 is illustrated in FIG. 4 with a graph showing a distribution ratio of a cathode exhaust gas that can be allowed to flow to the bypass 7 versus throttle opening of the flow control valve 7a. As is appreciated from the graph in FIG. 4, as the throttle opening increases, the distribution ratio (ratio of the flow rate) of the cathode exhaust gas that can be allowed to flow to the bypass 7 increases. It is to be understood that the flow characteristic applicable to the flow control valve 7a is "Equal percentage" in which equal increments of valve travel produce equal percentage changes in flow rates.

The throttle opening of the flow control valve 7a may be changed according to the output of the fuel cell 1, and the flow rate of the cathode exhaust gas passing through the bypass 7 may thereby be adjusted appropriately.

With the flow control valve 7a being provided in the bypass 7, the throttle opening may be changed according to the output of the fuel cell 1; thereby, a fine adjustment, finer than may be possible in the first embodiment, becomes possible to the flow rate of the cathode exhaust gas supplied to the fuel gas humidifier 2 when the output of the fuel cell 1 is higher. Consequently, the humidification level of the fuel gas in the fuel gas humidifier 2 may be more adequately reduced when the output of the fuel cell 1 is higher. Accordingly, the dew points of the fuel gases supplied to the fuel cell 1 may be equalized irrespective of varying outputs of the fuel cell 1. Further, the cathode exhaust gases directly supplied through the bypass 7 to the air humidifier 3 and thus having a high mist content may make the dew point of air supplied to the fuel cell 1 higher.

A humidifying system for a fuel cell according to a third embodiment of the present invention includes all the elements contained in the humidifying system for a fuel cell according to the first or second embodiment except that one end of the bypass 7 is connected with a mist distributor provided at a bifurcation, upstream of the first humidifier, where the cathode exhaust gas passage branches off into the bypass, to distribute a mist contained in the cathode exhaust gas to the bypass, while the other end of the bypass 7 is connected with a junction, downstream of the first humidifier, and joins the cathode exhaust gas passage.

With the bypass 7 being connected with the mist distributor for distributing a mist contained in the cathode exhaust gas in such a manner that the cathode exhaust gas may pass through the mist distributor, the flow rate of the cathode exhaust gas directed to the fuel gas humidifier 2 may be appropriately reduced. Consequently, the humidification level of the fuel gas in the fuel gas humidifier 2 may be more adequately reduced when the output of the fuel cell 1 is higher. Accordingly, the dew points of the fuel gases supplied to the fuel cell 1 may be equalized irrespective of varying outputs of the fuel cell 1. Further, the cathode exhaust gases directly supplied through the bypass 7 to the air humidifier 3 and thus having a high mist content may make the dew point of air supplied to the fuel cell 1 higher.

Next, a description will be given of various examples of the mist distributor that is provided upstream of the fuel gas humidifier 2 to distribute a mist contained in the cathode exhaust gas between the fuel gas humidifier 2 and the air humidifier 3, with reference to the drawings.

Figure 5A:
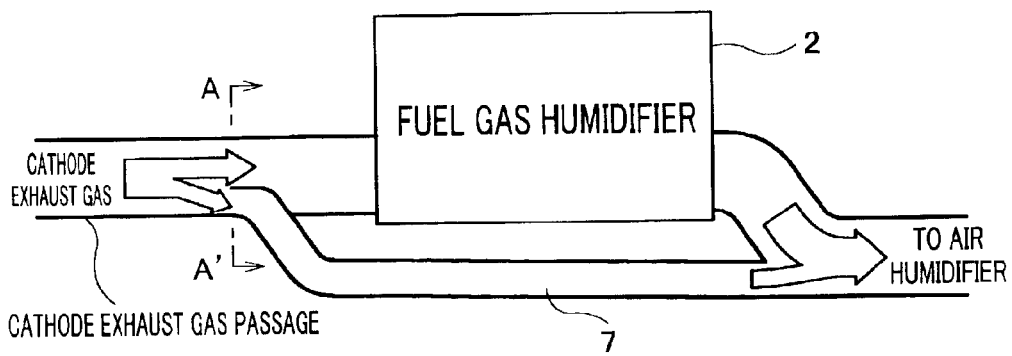
FIG. 5A is a diagram for explaining a first variation of a mist distributor according to a third embodiment of the present invention, in which a bypass connected with a cathode exhaust gas passage around a humidifier for a fuel gas is illustrated.
Figure 5B:
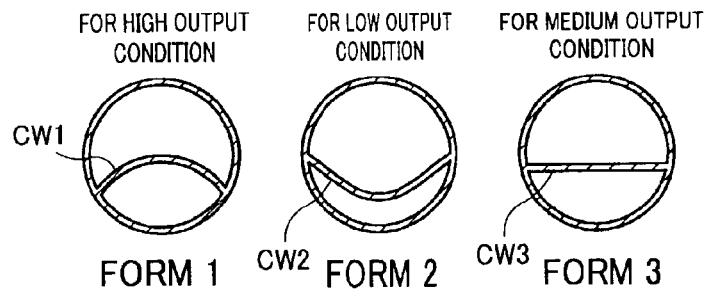
FIG. 5B shows cross-sectional views of three variations of the mist distributor taken along line A–A' of FIG. 5A.

Referring first to FIGS. 5A and 5B, a first variation of the mist distributor employed in the humidifying system for a fuel cell according to the third embodiment of the present invention will be described.

FIG. 5A is a diagram showing connection among the cathode exhaust gas passage, the fuel gas humidifier 2 and the bypass 7. FIG. 5B is a cross-sectional view of the mist distributor taken along A–A' of FIG. 5A.

The first variation of the mist distributor is a piping member provided in the cathode exhaust gas passage, specifically at a position upstream of the fuel gas humidifier 2, to distribute a mist in the cathode exhaust gas. The piping member has three varieties, which are illustrated in FIG. 5B, and an appropriate choice is made among these varieties according to the output of the fuel cell 1, so that an optimum piping member may be employed. A variety of cross-sectional profiles of the piping members are designed in view of the property of cathode exhaust gas streams; i.e., the stream containing a higher mist content, which results from the generation of a large amount of mists within the cathode exhaust gas associated with increase in the output of the fuel cell 1 from a lower level to a higher level, tends to run near the cross-sectional center of the cathode exhaust gas passage.

To illustrate more specifically, reference is made to FIG. 5B, of which FORM 1 represents a cross-sectional profile of the mist distributor for use in a high output condition of the fuel cell 1. In this FORM 1, an upward-convexedly curved plate as a partition wall CW1 is provided in the pipe, in order to increase a flow rate of the cathode exhaust gases that detour through the bypass 7, and to reduce a mist content contained within the cathode exhaust gases directed to the fuel gas humidifier 2 by preventing the stream passing near the cross-sectional center of the cathode exhaust gas passage and thus containing a higher mist content from being distributed to the fuel gas humidifier 2.

With this partition wall CW1 being provided, mists of which the major part is contained within the cathode exhaust gas stream passing near the cross-sectional center of the cathode exhaust gas passage come to the partition wall CW1 and get collected mainly into the bypass 7, whereas the cathode exhaust gas stream having a lower mist content is introduced into the fuel gas humidifier 2

FORM 2 of FIG. 5B represents a cross-sectional profile of the mist distributor for use in a low output condition of the fuel cell 1. In FORM 2, a downward-convexedly curved plate as a partition wall CW2 is provided in the pipe, in order to reduce a flow rate of the cathode exhaust gases that detour through the bypass 7, and to increase a mist content contained within the cathode exhaust gases directed to the fuel gas humidifier 2.

With this partition wall CW2 being provided, mists of which the major part is contained within the cathode exhaust gas stream passing near the cross-sectional center of the cathode exhaust gas passage are mainly introduced into the fuel gas humidifier 2, whereas the cathode exhaust gas stream having a lower mist content is introduced into the bypass 7.

Turning to FORM 3 illustrated in FIG. 5B, where there is shown a cross-sectional profile of the mist distributor for use in a medium output condition of the fuel cell 1. FORM 3 is such a form as to serve a function intermediate between FORM 1 and FORM 2; i.e., a substantially flat plate as a partition wall CW3 is provided in the pipe, at a lower position with respect to the center thereof.

With this partition wall CW3 being provided, mists passing through the cathode exhaust gas passage are so distributed that approximately half thereof is introduced into the fuel gas humidifier 2 and the bypass 7 respectively.

The bypass 7 is arranged so as not to ascend, but to level and/or descend with respect to a direction from an upstream end to a downstream end. By way of example, the bypass 7 according to the instant embodiment as shown in FIG. 5A is arranged to descend. This arrangement serves to prevent a puddle from being formed anywhere in the bypass 7. Accordingly, there is no fear of clogging the bypass 7 with water into which mists have been condensed.

With the first variation of the mist distributor being provided at an upstream end of the bypass 7, the cathode exhaust gas stream containing a higher mist content may be bypassed around the fuel gas humidifier 2 even when the output of the fuel cell 1 reaches the maximum, and thus the flow rate of (or the amount of mists in) the cathode exhaust gas directed to the fuel gas humidifier 2 may be reduced. Consequently, the humidification level of the fuel gas in the fuel gas humidifier 2 may be reduced when the output of the fuel cell 1 is higher. Accordingly, the dew points of the fuel gases supplied to the fuel cell 1 may be equalized irrespective of varying outputs of the fuel cell 1. Further, the cathode exhaust gases directly supplied through the bypass 7 to the air humidifier 3 and thus having a high mist content may make the dew point of air supplied to the fuel cell 1 higher.

Next, a second variation of the mist distributor will be described with reference to FIG. 6.

The second variation of the mist distributor is embodied in an arrangement such that the cathode exhaust gas passage is right-angled at an upstream bifurcation of a bypass 7' and connected via a right-angled elbow with an upstream side of the fuel gas humidifier 2, while a downstream side of the fuel gas humidifier 2 is connected via a right-angled elbow with the cathode exhaust gas passage which is right-angled at a downstream junction of the bypass 7'.

The bypass 7' is connected with the cathode exhaust gas passage so that a center of the cathode exhaust gas passage and a center of the bypass 7' are aligned with one and the same line. The upstream bifurcation of the bypass 7' is connected with the cathode exhaust gas passage via a pipe of which a diameter gradually decreases, and the downstream junction of the bypass 7' is connected with the cathode exhaust gas passage via a pipe of which a diameter gradually increases. That is, the diameter of the bypass 7' is smaller than that of the cathode exhaust gas passage. It is to be understood that the pipe may take on any shapes in cross section such as a circle and a rectangle.

The above arrangement allows the cathode exhaust gas running through the bypass 7' to pass at an increased velocity of flow with the least loss of pressure, and thus improves fluid carrying capability of the gas flow, thereby preventing water into which mists have been condensed from forming a puddle.

This bypass 7' is for example, arranged so as to descend with respect to a direction from an upstream end to a downstream end. Such arrangement serves to prevent a puddle from being formed anywhere in the bypass 7'. Accordingly, there is no fear of clogging the bypass 7' with water into which mists have been condensed.

With this arrangement of the second variation of the mist distributor, although the cathode exhaust gas stream that passes near the center in cross section of the cathode exhaust gas passage at the highest flow velocity tends to contain a relatively large amount of mists generated according as the output of the fuel cell 1 gets higher, the cathode exhaust gas stream containing a large amount of mists passes through the bypass 7' because the bypass 7' is connected in alignment with the cathode exhaust gas passage. Thus, the flow rate of (or the amount of mists in) the cathode exhaust gas directed to the fuel gas humidifier 2 may be reduced. As a result, the humidification level of the fuel gas in the fuel gas humidifier 2 may be adequately reduced when the output of the fuel cell 1 is higher. Accordingly, the dew points of the fuel gases supplied to the fuel cell 1 may be equalized irrespective of varying outputs of the fuel cell 1. Further, the cathode exhaust gases having a high mist content directly supplied through the bypass 7 to the air humidifier 3 and thus having a high mist content may make the dew point of air supplied to the fuel cell 1 higher.

Figure 6:
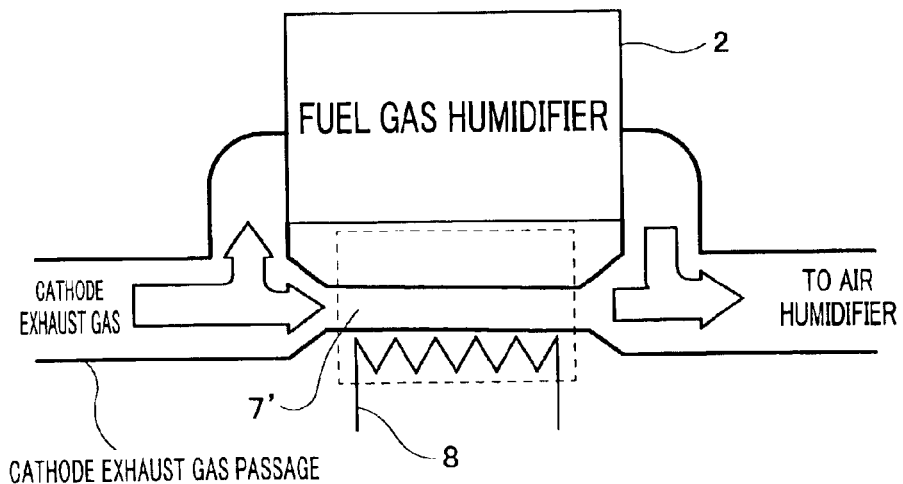
FIG. 6 illustrates a second variation of the mist distributor according to the third embodiment of the present invention.

As shown in FIG. 6, a heater 8 may be provided to heat the bypass 7', so that more steamy cathode exhaust gases may be fed to the air humidifier 3.

Figure 7:
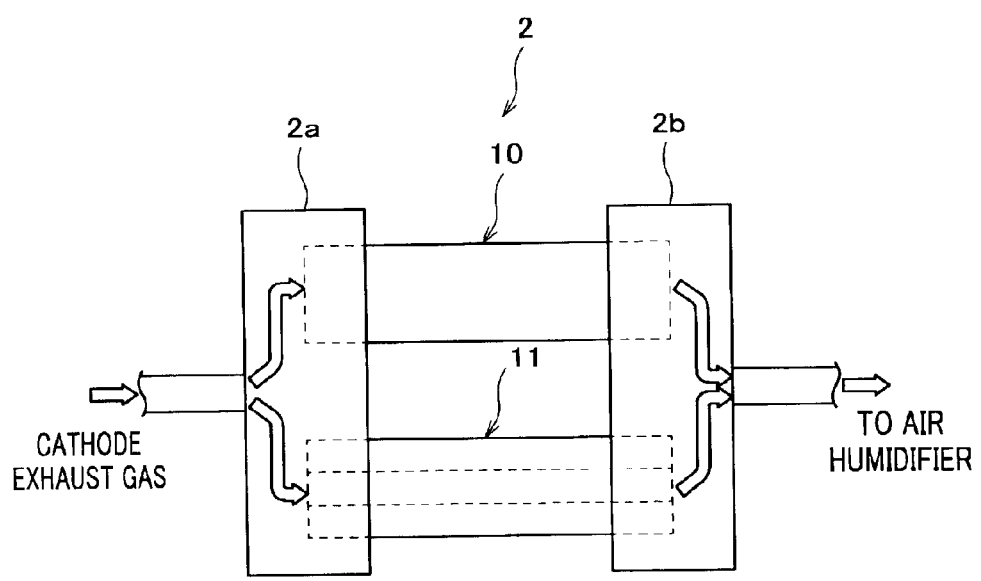
FIG. 7 illustrates a third variation of the mist distributor according to the third embodiment of the present invention.

Next, a third variation of the mist distributor will be described with reference to FIG. 7. It is understood that FIG. 7 is a schematic diagram of the fuel gas humidifier with a hollow pipe 11 simplified for the purpose of facilitating the understanding of the function thereof. More specifically, a fuel gas passage is formed, separate from a cathode exhaust gas passage, inside gas distribution units 2a, 2b, and in a humidification module 10, in actuality, but an illustration is omitted herein.

The third variation of the mist distributor is embodied, as shown in FIG. 7, in an arrangement within the fuel gas humidifier 2 that includes a plurality of humidification modules 10 (of which five are provided in the instant example) laid in a horizontal orientation with an adequate spacing between each other so as to extend between gas distribution units 2a, 2b. In this arrangement, one or more of the humidification modules 10 (of which one is provided in the instant example) are substituted with hollow pipes 11 of the same size and number.

According to the fuel gas humidifier 2 as the third variation of the mist distributor having such dummy hollow pipes 11 provided in place of the humidification modules 10, a cathode exhaust gas stream failing to pass through any of the humidification modules 10 and thus having a high mist content may be directly fed to the air humidifier 3 located at a downstream side of the fuel gas humidifier 2, because the flow rate of the cathode exhaust gas allowed to flow through the humidification modules 10 is distributed according to the ratio of pressure loss of each passage (of the humidification modules 10 and the hollow pipes 11). Accordingly, the dew points of the fuel gases supplied to the fuel cell 1 may be equalized irrespective of varying outputs of the fuel cell 1. Further, the cathode exhaust gases directly supplied through the hollow pipe 11 to the air humidifier 3 and thus having a high mist content may make the dew point of air supplied to the fuel cell 1 higher.

Figure 8:
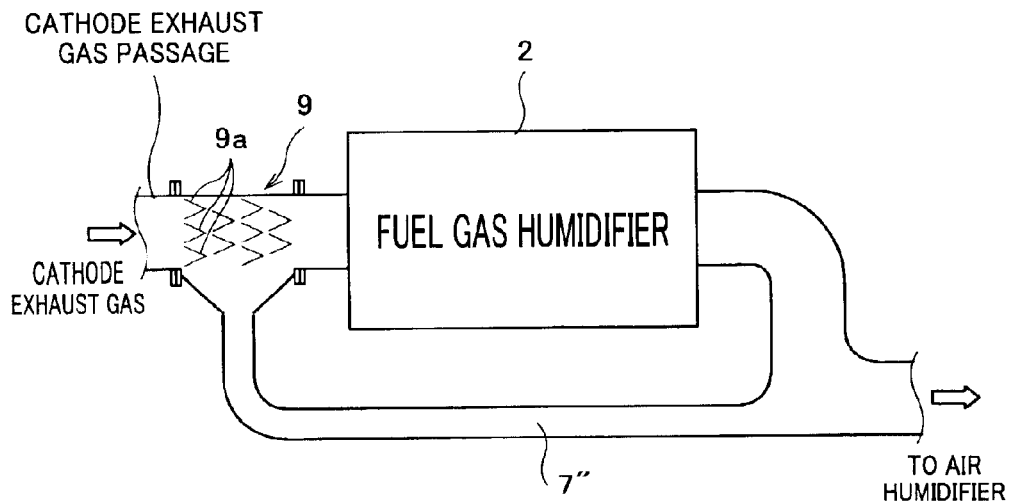
FIG. 8 illustrates a fourth variation of the mist distributor according to the third embodiment of the present invention.

Next, a fourth variation of the mist distributor will be described with reference to FIG. 8. The fourth variation of the mist distributor is an angle plate mist eliminator 9 provided at an upstream side of the fuel gas humidifier 2. The mist eliminator 9 includes a plurality of angle plates 9a having an angular section with an open side thereof facing in an upstream direction.

The mist eliminator 9 is configured to collide mists in the cathode exhaust gases with the angle plates 9a, so that the amount of mists in the cathode exhaust gases supplied to the fuel gas humidifier 2 may be regulated as appropriate.

The amount of mists supplied to the fuel gas humidifier 2 may be adequately regulated by varying the shape and number of the angle plates 9a to be provided, the arrangement thereof, and the like.

The cathode exhaust gas passage and the fuel gas humidifier 2 are connected with each other and aligned with one and the same line. In contrast, the bypass 7" has one end thereof connected perpendicularly at a T-shaped bifurcation, upstream of the fuel gas humidifier 2, with the cathode exhaust gas passage, and the other end thereof connected perpendicularly at a T-shaped junction, downstream of the fuel gas humidifier 2, with the cathode exhaust gas passage.

This arrangement may resultantly allow high-humidity cathode exhaust gases to be also supplied to the air humidifier 3 located downstream of the fuel gas humidifier 2, and thus the dew points of the fuel gases supplied to the fuel cell 1 may be equalized irrespective of varying outputs of the fuel cell 1. Further, the cathode exhaust gases directly supplied through the bypass 7" to the air humidifier 3 and thus having a high mist content may make the dew point of air supplied to the fuel cell 1 higher.

Figure 9:
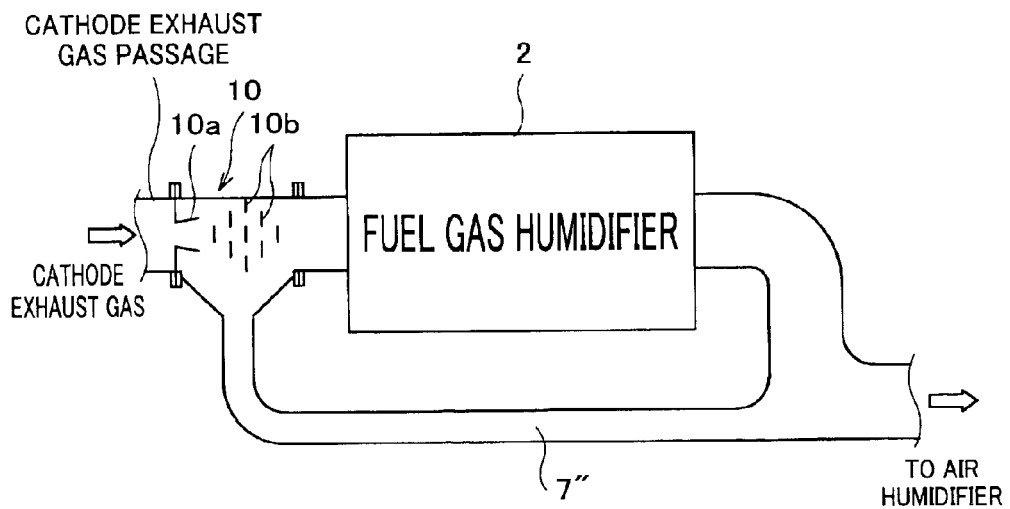
FIG. 9 illustrates a fifth variation of the mist distributor according to the third embodiment of the present invention.

Next, a fifth variation of the mist distributor will be described with reference to FIG. 9. The elements identical with those which constitute the fourth variation of the mist distributor will be designated by the same reference numerals for convenience of explanation.

The fifth variation of the mist distributor is a reducing mechanism provided at an upstream side of the fuel gas humidifier 2, as may be exemplified by a mist eliminator 10 including an orifice 10a and a plurality of collision plates 10b disposed at a downstream side of the orifice 10a.

The mist eliminator 10 coercively raises a flow velocity of mists in the cathode exhaust gases using the orifice 10a, and collides the mists with the collision plates 10b provided downstream thereof to regulate the amount of mists introduced into the fuel gas humidifier 2.

The cathode exhaust gas passage and the fuel gas humidifier 2 are connected with each other and aligned with one and the same line.

The bypass 7" has one end thereof connected perpendicularly at a T-shaped bifurcation, upstream of the fuel gas humidifier 2, with the cathode exhaust gas passage, and the other end thereof connected perpendicularly at a T-shaped junction, downstream of the fuel gas humidifier 2. with the cathode exhaust gas passage.

This arrangement may resultantly allow high-humidity cathode exhaust gases to be also supplied to the air humidifier 3 located downstream of the fuel gas humidifier 2, and thus the dew points of the fuel gases supplied to the fuel cell 1 may be equalized irrespective of varying outputs of the fuel cell 1. Further, the cathode exhaust gases directly supplied through the bypass 7" to the air humidifier 3 and thus having a high mist content may make the dew point of air supplied to the fuel cell 1 higher.

Figure 10:
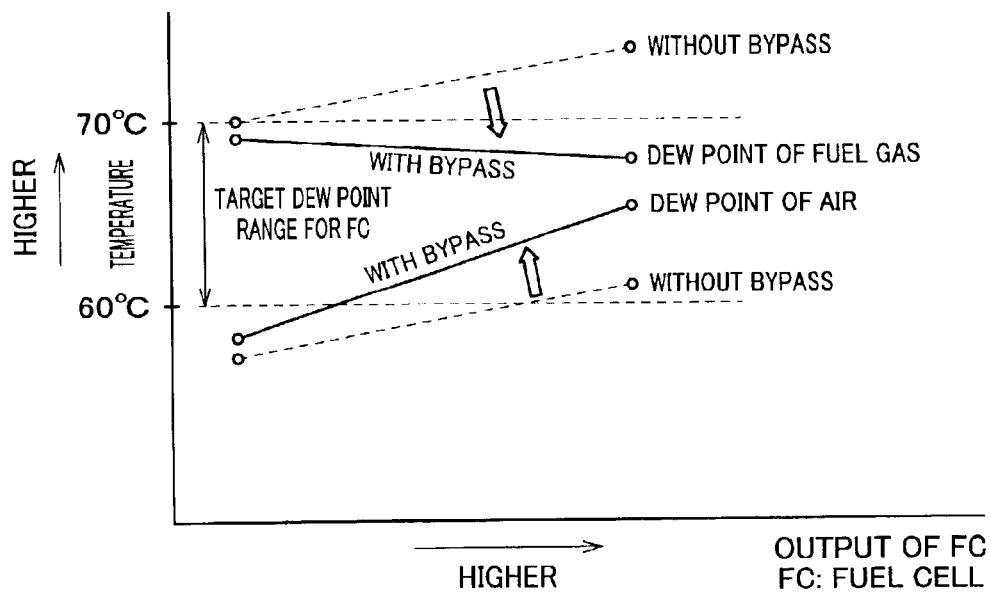
FIG. 10 is a graph showing dew points of a fuel gas and air as measured when the humidifying system for a fuel cell according to the third embodiment was implemented and adopted to a fuel cell.
Figure 11:
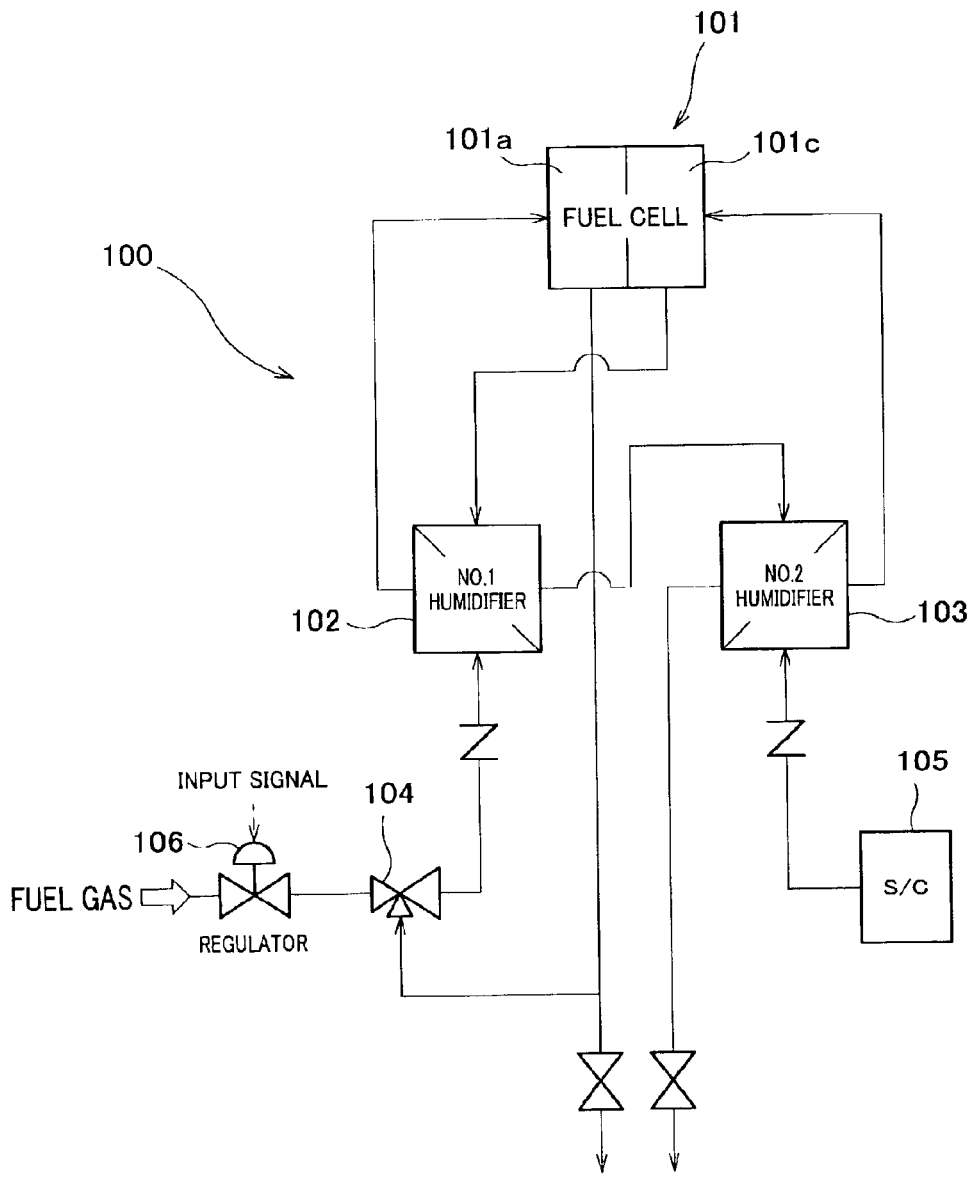
FIG. 11 is a general block diagram of a conventional humidifying system for a fuel cell.
Figure 12:
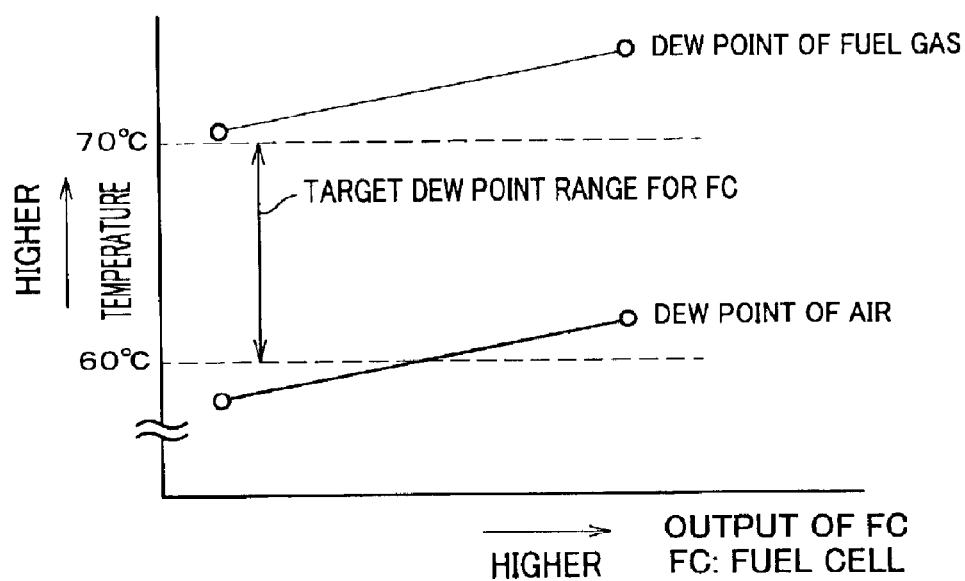
FIG. 12 is a graph showing dew points of a fuel gas and air as measured when the conventional humidifying system for a fuel cell was implemented and adopted to a fuel cell.

Lastly, the dew points of a fuel gas and air as measured when the humidifying system for a fuel cell according to the third embodiment was implemented and adopted to a fuel cell in practice are shown in FIG. 10.

As shown in the graph of FIG. 10, even when the output of the fuel cell 1 gets higher, the dew points of a fuel gas and air fall within the target dew point range for the fuel cell, thanks to the bypass provided. It is to be understood that the target dew point range as shown in the graph is exemplary only.

As have been described in each preferred embodiment above, with the bypass being provided to the passage of cathode exhaust gases discharged from the fuel cell to externally or internally bypass the fuel gas humidifier (i.e., the hollow pipe in the third variation of the mist distributor may herein be considered to be the bypass), it becomes possible to provide a humidifying system that may have the balance between humidification levels of fuel gases and oxidant gases each supplied to a fuel cell kept and adjusted properly even when the output of the fuel cell gets higher.

Although the preferred embodiments of the present invention have been described above, the humidifying system for a fuel cell according to the present invention is not limited thereto, and various modifications and changes may be practically made in the present invention without departing from the spirit and scope thereof.

For example, a filter-type mist eliminator in which a filter medium such as urethane foam is filled may be provided as the mist distributor.

According to the present invention as described above, the following advantageous effects may be achieved.

(1) The bypass that is provided to the cathode exhaust gas passage so as to avoid the first humidifier serves to regulate a flow rate of the cathode exhaust gas according to a ratio of pressure loss in the gas passing from an upstream bifurcation of the bypass through the first humidifier to a downstream junction of the bypass relative to pressure loss in the gas passing through the bypass. Therefore, even when an output of the fuel cell gets higher and thus the flow rate of the cathode exhaust gas flowing through the first humidifier increases, the cathode exhaust gas to be flown through the first humidifier may be decreased properly. As a result, the humidification level of the fuel gas in the first humidifier may be reduced.

(2) The bypass flow controller, which is provided in the bypass to control a flow rate of the cathode exhaust gas flowing through the bypass by varying throttle opening according to an output of the fuel cell, may make an adjustment possible to the flow rate of the cathode exhaust gas supplied to the first humidifier irrespective of varying outputs of the fuel cell. Therefore, the humidification level of the fuel gas in the first humidifier may be adequately reduced.

(3) A mist distributor, which is provided at a bifurcation, upstream of the first humidifier, where the cathode exhaust gas passage branches off into the bypass, to distribute a mist contained in the cathode exhaust gas to the bypass, may allow part of the cathode exhaust gas containing a high mist content to bypass the first humidifier, and get directly introduced to the second humidifier when the output of the fuel cell is higher. Therefore, the second humidifier provided downstream of the first humidifier may be supplied with a high-humidity cathode exhaust gas.

(4) The bypass, which is so arranged as to level and/or descend (i.e., not to ascend) throughout a length thereof with respect to a direction from an upstream end to a downstream end, may serve to prevent the bypass from getting clogged with water into which mists have been condensed, which water would otherwise form a puddle in the bypass, even when the output of the fuel cell is lower and the flow velocity is lower.

What is claimed is:

1. A humidifying system for a fuel cell comprising:
a fuel cell including an anode and a cathode, in which a fuel gas supplied to the anode and an oxidant gas supplied to the cathode chemically react with each other to generate electricity;
a first humidifier that transfers moisture contained in a cathode exhaust gas discharged from the cathode, to the fuel gas through a hollow fiber membrane;
a second humidifier that transfers moisture contained in a cathode exhaust gas discharged from the first humidifier, to the oxidant gas through a hollow fiber membrane;
a cathode exhaust gas passage through which the cathode exhaust gas flows from the cathode of the fuel cell via the first humidifier to the second humidifier; and a bypass that is provided to the cathode exhaust gas passage to allow part of the cathode exhaust gas to detour round the first humidifier and flow to the second humidifier.

2. A humidifying system according to claim 1, further comprising a bypass flow controller that is provided in the bypass to control a flow rate of the cathode exhaust gas flowing through the bypass by varying throttle opening according to an output of the fuel cell.

3. A humidifying system according to claim 1, further comprising a mist distributor that is provided at a bifurcation, upstream of the first humidifier, where the cathode exhaust gas passage branches off into the bypass, to distribute a mist contained in the cathode exhaust gas to the bypass.

4. A humidifying system according to claim 1, wherein the bypass levels and/or descends throughout a length thereof with respect to a direction from an upstream end to a downstream end.

5. A humidifying system according to claim 3, wherein the mist distributor includes a partition wall having varieties of forms exchangeable according to an output of the fuel cell.

6. A humidifying system according to claim 1, wherein the bypass is connected with the cathode exhaust gas passage so that a center of the cathode exhaust gas passage and a center of the bypass are aligned with one and the same line; and wherein a diameter of the bypass is smaller than that of the cathode exhaust gas passage.

7. A humidifying system according to claim 1, further comprising a heater that heats the bypass.

8. A humidifying system according to claim 1, wherein the bypass is comprised of at least one hollow pipe provided in place of some of humidification modules in the first humidifier so that a cathode exhaust gas partially passes through the hollow pipe without transferring moisture contained therein to the fuel gas.

9. A humidifying system according to claim 3, wherein the mist distributor includes a plurality of angle plates each having an angular section with an open side thereof facing in an upstream direction.

10. A humidifying system according to claim 3, wherein the mist distributor includes:

an orifice that coercively raises a flow velocity of mists contained in the cathode exhaust gas; and a plurality of collision plates disposed at a downstream side of the orifice to regulate the amount of mists introduced into the first humidifier.

* * * * *